United States Patent [19]

Langfitt, Jr.

[11] Patent Number: 5,759,611
[45] Date of Patent: Jun. 2, 1998

[54] FRUIT PROCESSING SYSTEM AND METHOD

[76] Inventor: David R. Langfitt, Jr., 2425 53rd Ave., Vero Beach, Fla. 32966

[21] Appl. No.: 660,917

[22] Filed: Jun. 10, 1996

[51] Int. Cl.$^6$ .................................................... A23L 1/025
[52] U.S. Cl. ........................ 426/616; 426/333; 426/425; 426/479; 426/482; 426/615
[58] Field of Search .......................... 426/482, 615, 426/616, 333, 425, 479

[56] References Cited

U.S. PATENT DOCUMENTS

| | | | |
|---|---|---|---|
| 4,065,582 | 12/1977 | Webb et al. | 426/482 |
| 5,560,951 | 10/1996 | Pao et al. | 426/482 |

*Primary Examiner*—Helen Pratt
*Attorney, Agent, or Firm*—Malin, Haley, DiMaggio & Crosby

[57] ABSTRACT

A new method for processing citrus fruit into a marketable product of separate whole natural sections involves as an essential step the injecting of water under pressure simultaneously at a plurality of separated locations into the citrus fruit substantially restricted to the albedo level depth without bursting of the skin. Typically, a complete processing method includes the steps (a) providing a quantity of whole citrus fruit, (b) chilling the fruit to between about 35°–45° F., (c) blanching the chilled fruit at about 160°–180° F. for about 1–3 minutes, (d) injecting water under pressure at a plurality of separated locations into the blanched fruit substantially restricted to the albedo level depth, (e) peeling the skin from the water injected fruit, (f) immersing the peeled fruit in a caustic bath, (g) separating the immersed and peeled fruit into individual whole sections, and (h) recovering the separated whole sections as a marketable product. Systems for conducting such methods and injector devices for performing the fruit injection step are disclosed.

7 Claims, 3 Drawing Sheets

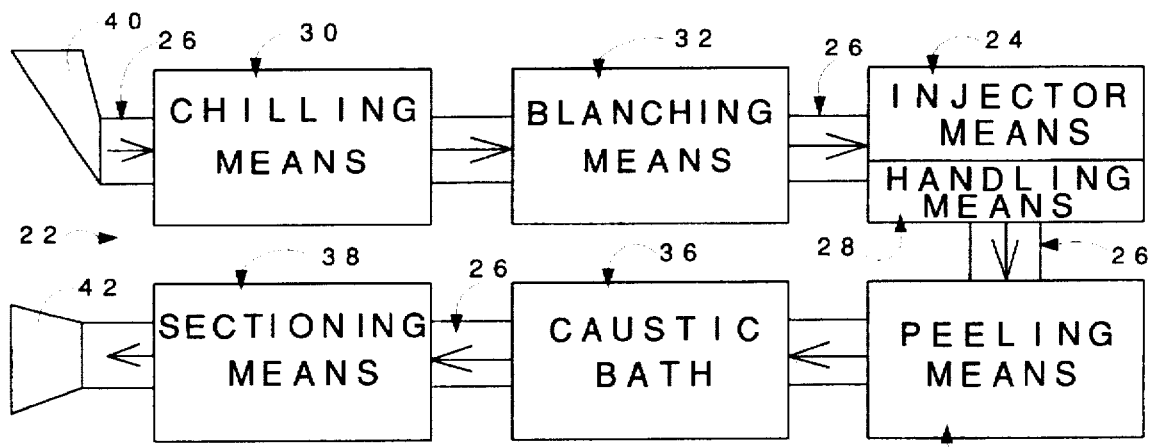
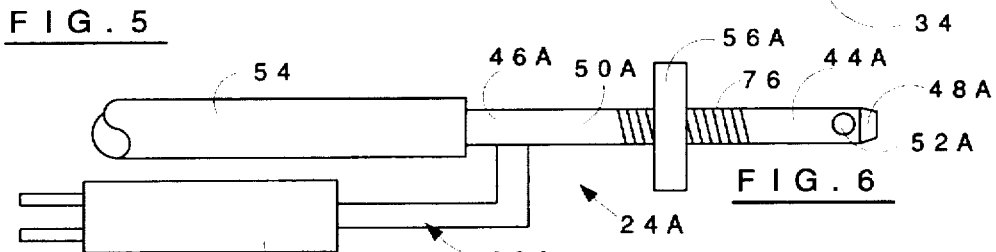
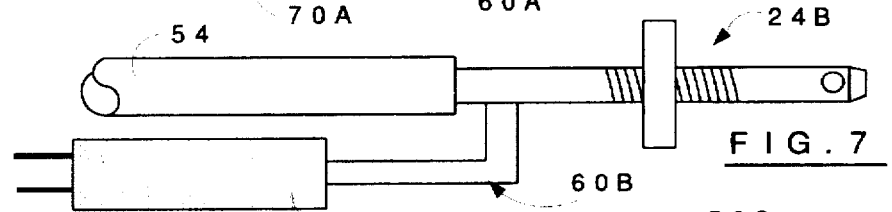
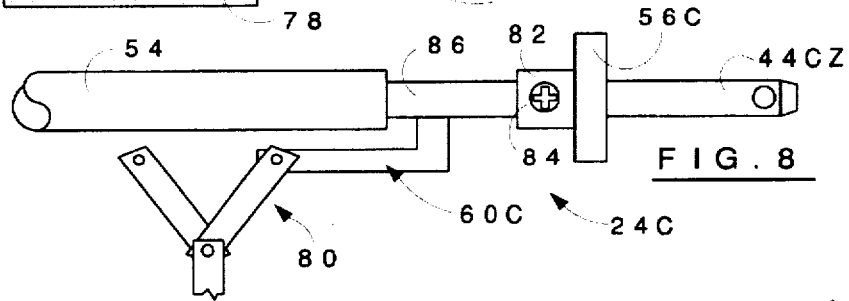
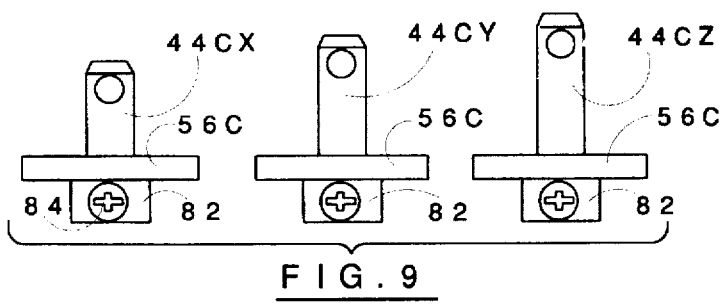
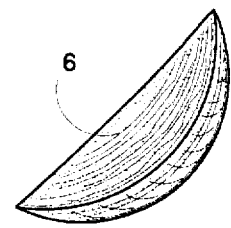

FRUIT PROCESSING SYSTEM AND METHOD

BACKGROUND OF THE INVENTION

1. Field of the Invention

This application relates to fruit processing systems and methods. More particularly, it concerns the processing of citrus fruit, e.g., oranges and grapefruit, to remove the skin and separate the skin free fruit into its natural sections to obtain whole fruit sections as marketable product.

2. Description of the Prior Art

Citrus and various other forms of fruit comprise juice bearing pulp structured as small juice sacs interconnected in the form of separable sections defined by membrane walls. These sections are generally triangular in cross section and are assembled in the fruit with the apex facing inward forming a sphere which is encased by albedo and skin. In some citrus species, i.e., tangerines and certain navel oranges, the skin is easily peeled and the sections readily separated. However, in most citrus fruit, the connections between to inner sections, albedo and outer skin are relatively strong so peeling of the skin and sectionizing of the peeled interior is difficult.

Once a citrus fruit is peeled and sectioned, the individual sections are easily handled and pleasant to eat, but most people are not interested in spending the time to peel and section citrus fruit because of the trouble in doing so. Hence, there is a substantial market for whole citrus fruit sections that have already been peeled and sectioned. This demand is not being adequately supplied because of the difficulty of doing this in a commercially and economically feasible manner.

Historically, peeling citrus fruit and sectionizing the peeled fruit has generally been a manually intensive operation. Several things have been tried to help the manual operations, e.g., steam heating and also enzyme injection has been used to assist in manual peeling. Also, peeled fruit has been subjected to hot lye baths to help remove the albedo from the section membranes.

Some machines have been developed for peeling citrus fruit and for sectionizing the peeled fruit, e.g., see U.S. Pat. No. 2,489,195. The present invention provides further improvements in the commercial peeling and sectioning of citrus fruit.

OBJECTS

A principal object of the invention is the provision of new improvements in the commercial peeling and sectioning of citrus fruit.

Further objects include the provision of:

1. A new method for peeling the skin and albedo from citrus fruit.

2. New apparatus for peeling the skin and albedo from citrus fruit.

3. A new method for processing citrus fruit into a marketable product of separated, whole natural sections.

4. A new system for processing citrus fruit into a marketable product of separated, whole natural sections.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of a new method for processing citrus fruit into a marketable product of separate whole natural sections that comprises as an essential step the injecting of water under pressure simultaneously at a plurality of separated locations into the citrus fruit substantially restricted to the albedo level depth without bursting of the skin. Advantageously, this step is performed using injector means for injecting water under pressure simultaneously at a plurality of separated locations into the citrus fruit substantially restricted to the albedo level depth.

Stated in more detail, citrus fruit processing of the invention comprises in combination the steps (a) providing a quantity of whole citrus fruit, (b) chilling the fruit to between about 35°–45° F., (c) blanching the chilled fruit at about 160°–180° F. for about 1–3 minutes, (d) injecting water under pressure at a plurality of separated locations into the blanched fruit substantially restricted to the albedo level depth without bursting of the skin thereof, (e) peeling the skin from the water injected fruit, (f) immersing the peeled fruit in a caustic bath, (g) separating the immersed and peeled fruit into individual whole sections, and (h) recovering the separated whole sections as a marketable product. Advantageously, in step "d" the injected water pressure is between about 10–30 psi and the peeling step "e" is performed either mechanically or manually.

The invention further concerns a new system for processing citrus fruit into a marketable product of separate whole natural sections that basically comprises (1) injector means for injecting water under pressure simultaneously at a plurality of separated locations into the citrus fruit substantially restricted to the albedo level depth, (2) conveyor means for moving the citrus fruit toward and away from the injector means and (3) handling means for positioning the citrus fruit moved by the conveyor means relative to the injector means.

Advantageously, such new system additionally comprises (4) chilling means to chill the citrus fruit to between about 35–45™ F., (5) blanching means to blanch the chilled citrus fruit for about 1–3 minutes at 160–180™ F., (6) peeling means to peel the skin from the citrus fruit following injection of water by the injector means, (7) a caustic bath for immersion therein of the peeled citrus fruit, and (8) sectioning means for dividing the citrus fruit into whole natural sections.

In preferred embodiments, the new injector means for processing citrus fruit into a marketable product of separate whole natural sections by injecting liquid under pressure into the citrus fruit substantially restricted to the albedo level depth without bursting of the skin thereof comprises (A) a hypodermal cannula adapted to penetrate the skin of the citrus fruit and enable the injection of liquid defined by a proximal end, a distal end and a longitudinal tubular wall, (B) a plurality of bores through the tubular wall juxtaposed to the distal end though which the liquid may flow normal to the longitudinal axis of the tubular wall, (C) conduit means adapted for connection to a source of pressurized liquid and attached to the proximal end, (D) stop means positioned on the cannula proximal of the distal end adapted to limit the depth of the penetration of the skin by the cannula, and (E) reciprocation means to cause the cannula to penetrate the skin of the citrus fruit to a depth controlled by the stop means and to remove the cannula from the citrus fruit following the injection of the liquid.

In a first embodiment, the reciprocation means "E" includes a hydraulic piston, in a second embodiment it includes an electric solenoid and in a third embodiment it includes a lever.

In one embodiment, the positioning of the stop means "TV" is adjustable, e.g., by threaded connection to the cannula, while in another embodiment there are interchangeable sets of the cannulas, each of the sets having the stop means positioned thereon at a different distance proximal of the distal end.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein:

FIG. 5 is a diagrammatic representation of a system of the invention for processing citrus fruit into a marketable product of separated, whole natural sections.

FIG. 6 is a plan view of a hypodermal cannula device of the invention for injection of liquid at a controlled depth beneath the skin of citrus fruit comprising a hydraulic piston.

FIG. 7 is a plan view of a hypodermal cannula device of the invention for injection of liquid at a controlled depth beneath the skin of citrus fruit comprising an electric solenoid.

FIG. 8 is a plan view of a hypodermal cannula device of the invention for injection of liquid at a controlled depth beneath the skin of citrus fruit comprising a lever.

FIG. 9 is a plan view of an interchangeable set of injection cannulas of the invention.

FIG. 10 is an isometric view of a whole section of citrus fruit obtained in accordance with the invention as a marketable product.

DESCRIPTION OF THE PREFERRED EMBODIMENTS

Figure 1:
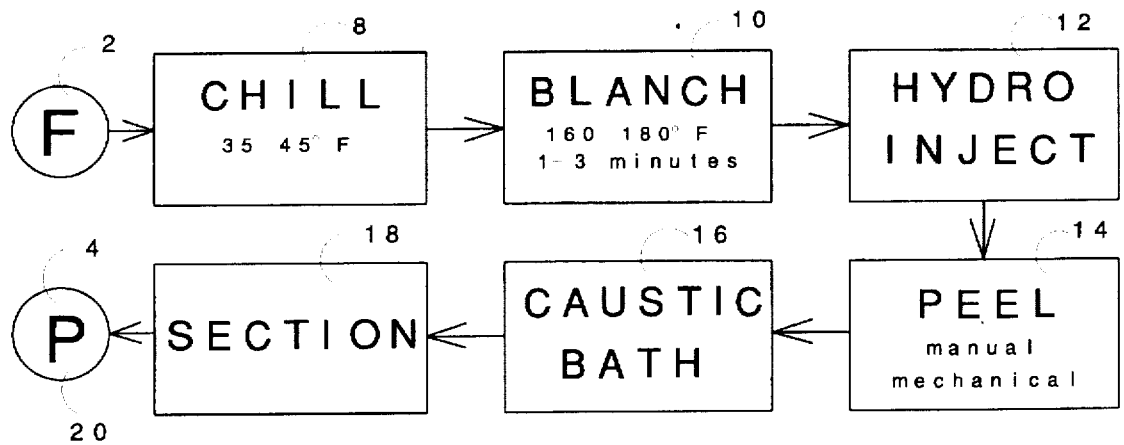
FIG. 1 is diagrammatic flow sheet of steps comprising the new method of the invention for processing citrus fruit into a marketable product of separated, whole natural sections.

Referring in detail to the drawings, the new method of the invention for processing citrus fruit 2 into a marketable product 4 of separate whole natural sections 6 comprises (a) providing a quantity of whole citrus fruit 2, (b) chilling 8 the fruit to between about 35°–45° F., (c) blanching 10 the chilled fruit at about 160°–180° F. for about 1–3 minutes, (d) injecting 12 water under pressure at a plurality of separated locations into the blanched fruit substantially restricted to the albedo level depth, (e) peeling 14 the skin from the water injected fruit, (f) immersing 16 the peeled fruit in a caustic bath, (g) separating 18 the immersed and peeled fruit into individual whole sections, and (h) recovering 20 the separated whole sections as a marketable product. Advantageously, in step 12 the injected water pressure is between about 10–30 psi.

With reference to FIGS. 2–5, the system 22 for processing citrus fruit 2 into a marketable product of separate whole natural sections 6 basically comprises injector means 24 for injecting water under pressure simultaneously at a plurality of separated locations into the citrus fruit substantially restricted to the albedo level depth, conveyor means 26 for moving the citrus fruit toward and away from the injector means and handling means 28 for positioning the citrus fruit moved by the conveyor means relative to the injector means 24.

The new system 22 additionally comprises chilling means 30, blanching means 32, peeling means 34, a caustic bath 36 for immersion therein of the peeled citrus fruit and sectioning means 38 for dividing the citrus fruit into whole natural sections 6.

The conveyor 26 initially receives fruit 2 from a hopper 40 or like source of unprocessed fruit and ultimately delivers the processed whole sections 6 to a packaging station 42 for bottling (not shown) or packaging in other desired manner.

Figure 2:
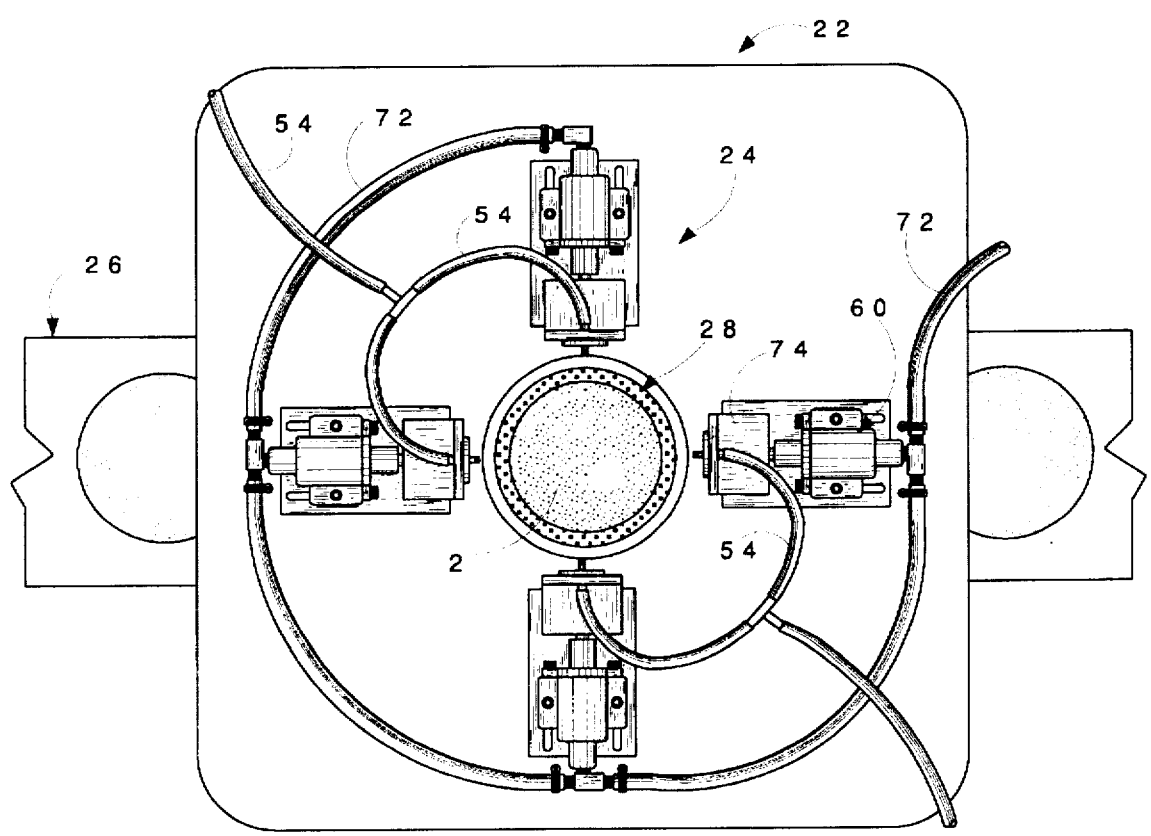
FIG. 2 is plan view of a hydro injector station of a system of the invention for processing citrus fruit in its open, fruit reception mode.
Figure 3:
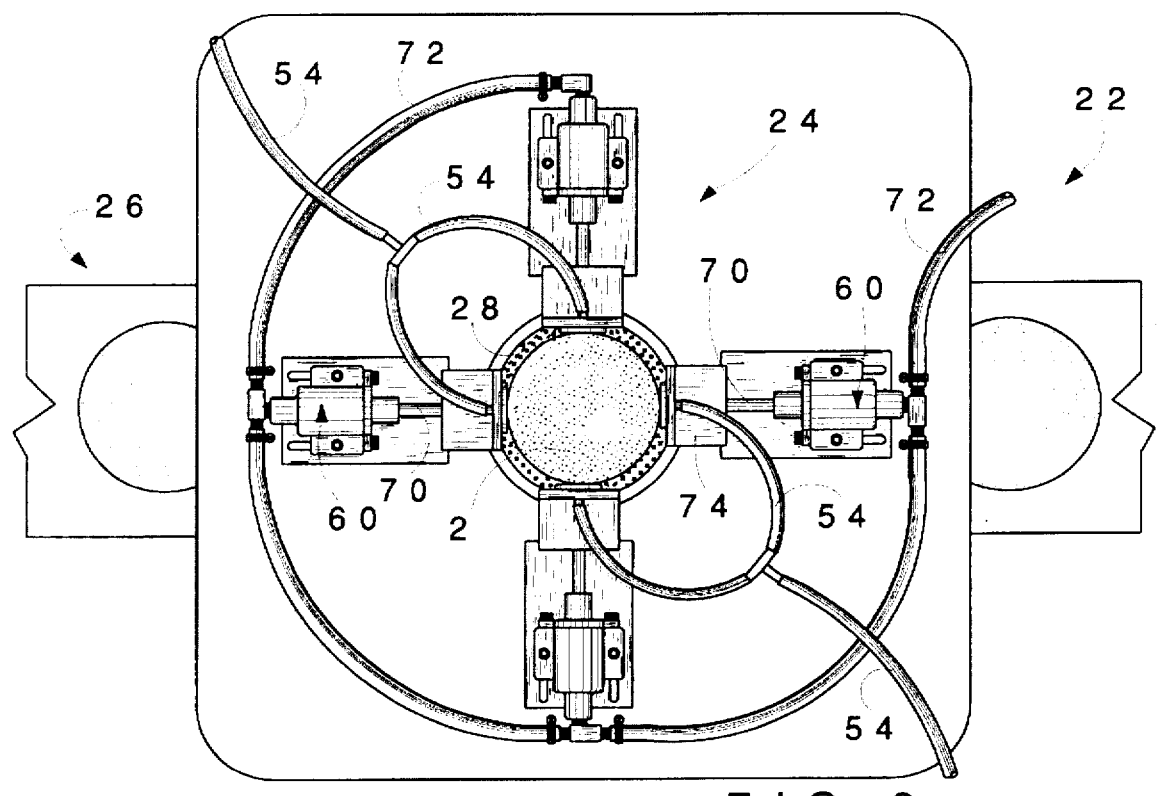
FIG. 3 is plan view of the hydro injector station of FIG. 2 in its closed, fruit injection mode.
Figure 4:
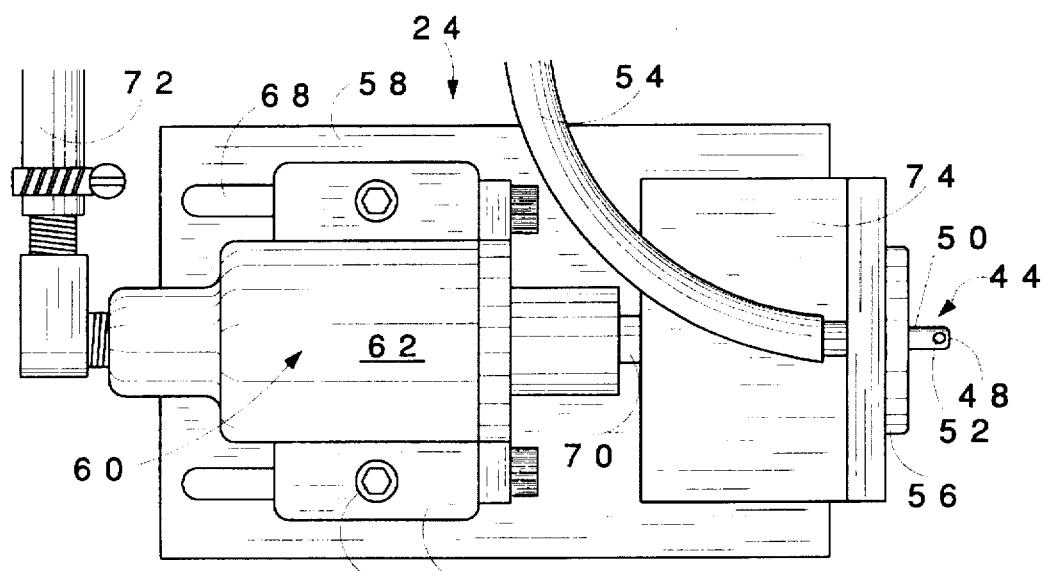
FIG. 4 is a plan view of a liquid injector device of the invention for injection of liquid at a controlled depth beneath the skin of citrus fruit.

With reference to FIGS. 2–4, a preferred embodiment of injector means 24 of the invention comprises a hypodermal cannula 44 adapted to penetrate the skin of the citrus fruit 2 having a proximal end 46, a distal end 48, a longitudinal tubular wall 50 and a plurality of bores 52 through the tubular wall 50 juxtaposed to the distal end 48 though which the liquid may flow normal to the longitudinal axis of the tubular wall 50.

Conduit means 54 connects the proximal end 46 to a source of pressurized liquid (not shown).

Stop means 56 is positioned on the cannula 44 proximal of the distal end 48 is adapted to limit the depth of the penetration of the skin of fruit 2 by the cannula 44.

The injector means 24 further comprises a base 58 that adjustably carries reciprocation means 60 to move the cannula 44 from an open mode as show in FIG. 2 to a closed mode as shown FIG. 3 to penetrate the skin of the citrus fruit 2 to a depth controlled by the stop means 56 and then return cannula 44 to the open mode to remove the cannula from the citrus fruit following the injection of the liquid.

Reciprocation means 60 comprises a casing 62 with mounting wings 64 by which casing 62 is adjustably attached to base 58 by fasteners 66 that ride in base slots 68. A pressure fluid, e.g., pneumatic or hydraulic, operates piston 70 to reciprocate in casing 62 under control of pressure fluid delivered to means 60 via conduit 72 from a pressure control source (not shown). The cannula 44 is carried on a bracket 74 which reciprocates on the base 58 in response to the piston 70.

Operation of the handling means 28 and reciprocation means 60 can be controlled manually by an observer positioned near the injector means 24, but advantageously such operation will be automatically operated by controls (not shown) integrated with the conveyor means 26 using commercially available control units as will apparent to those skilled in the art.

FIGS. 6–8 illustrate different embodiments of the injector means 24 of the invention. In injector means 24A of FIG. 6, the reciprocation means 60A includes a fluid operated piston 70A attached to the hypodermal cannula 44A having a distal end 48A, a longitudinal tubular wall 50A and a plurality of bores 52A through the tubular wall 50A though which liquid may flow normal to the longitudinal axis of the tubular wall 50A. The proximal end 46A is connected to conduit 54 to receive liquid from a supply source (not shown) to be injected into citrus fruit via bores 52A. Stop means 56A engages threads 76 that enable the position of stop means 56A to be varied relative to the distal end 48A of cannula 44A.

In injector means 24B of FIG. 7, the reciprocation means 60B includes an electric solenoid 78 to move the cannula 44B into and out of citrus fruit.

In injector means 24C of FIG. 8, the reciprocation means 60C includes lever means 80 to perform the reciprocation function.

FIG. 8 also illustrates a variation of the invention for control of depth of liquid injection into fruit that comprises a set of interchangeable cannulas 44CX, 44CY & 44CZ (shown in FIG. 9), each of which includes stop means 56C and a collar 82 bearing a set screw 84 which enables the cannulas to be interchanged on tubular connector 86 attached to the conduit 54.

Operation of systems of the invention for processing citrus fruit into a marketable product of separate whole natural sections can be visualized by reference to FIGS. 2, 3 & 5. Whole citrus fruit is acquired from source 40 by the conveyor means 26 and passed via chilling means 30 and blanching means 32 to the station comprising injector means 24 and handling means 28. It will be apparent to those skilled in the art that the conveyor means 26 is structured vis-a-vis chilling means 30 and blanching means 32 to permit fruit passing in the system to experience dwell times at each station needed to chill the fruit to about 35°–45° F. and to blanch the fruit at about 160°–180° F. for about 1–3 minutes.

At the hydro injection step 12, the handling means 28 positions fruit 2 as shown in FIG. 2 to enable reciprocation means 60 to push the cannulas 44 of injector means 24 into the fruit 2 so that the bores 52 penetrate the fruit 2 only to the depth of the albedo level whereupon liquid, typically water, is forced under controlled pressure into the fruit beneath the fruit's skin without bursting it. This injection step typically takes about 3 to 6 seconds for each piece of fruit, following which the reciprocation means 60 returns the injector means 24 to the open mode as shown in FIG. 2 whereupon the handling means 28 returns the injected fruit to the conveyor means 26 and acquires a new piece of fruit for injection in like manner.

I claim:

1. A method for processing citrus fruit into a marketable product of separate whole natural sections which comprises in combination the steps:

providing a quantity of whole citrus fruit, chilling said fruit to between about 35°–45° F., blanching the chilled fruit at about 16°–180° F. for about 1–3 minutes, inserting a plurality of hypodermal cannulae into said whole fruit to a preselected depth at a plurality of separated locations, each of said hypodermal cannulae penetrating through a skin of said fruit, injecting water under a preselected pressure simultaneously through said plurality of hypodermal cannulae at said plurality of separated locations into said blanched fruit substantially restricted to the albedo level depth for a predetermined period of time without bursting of the skin thereof, withdrawing said plurality of hypodermal cannulae from said fruit, allowing said water under pressure to escape from said fruit;

peeling said skin from said water injected fruit, immersing said peeled fruit in a caustic bath, separating the immersed and peeled fruit into individual whole sections, and recovering the separated whole sections as a marketable product.

2. A method for pretreating a whole citrus fruit for facilitating peeling thereof in processing said citrus fruit into a marketable product of separate whole natural sections which comprises the steps of penetrating a skin of said whole fruit at a plurality of separated locations, injecting water under pressure of between about 10–30 psi simultaneously at said plurality of separated locations into said citrus fruit substantially restricted to the albedo level depth without bursting of the skin thereof.

3. The method of claim 2 which is combined with steps of chilling and blanching prior to said pretreating.

4. The method of claim 2 which is combined after said pretreating with steps of peeling said skin from said water injected citrus fruit and immersing the peeled fruit in a caustic bath.

5. The method of claim 2 wherein said injecting water under pressure of between about 10–30 takes about 3 to 6 seconds.

6. A method for processing citrus fruit into a marketable product of separate whole natural sections which comprises in combination the steps:

providing a quantity of whole citrus fruit, chilling said fruit to between about 35°–45° F., blanching the chilled fruit at about 160°–180° F. for about 1–3 minutes, inserting a plurality of hypodermal cannulae into said whole fruit to a preselected depth at a plurality of separated-locations, each of said hypodermal cannulae penetrating through a skin of said fruit, injecting water under pressure of between about 10–30 psi simultaneously at said plurality of separated locations into said blanched fruit substantially restricted to the albedo level depth without bursting of the skin thereof, withdrawing said plurality of hypodermal cannulae from said fruit, allowing said water under pressure to escape form said fruit;

peeling said skin from said water injected fruit, immersing said peeled fruit in a caustic bath, separating the immersed and peeled fruit into individual whole sections, and recovering the separated whole sections as a marketable product.

7. The method of claim 6 wherein said injecting water under pressure of between about 10–30 psi takes about 3 to 6 seconds.

* * * * *

UNITED STATES PATENT AND TRADEMARK OFFICE
Certificate

Patent No. 5,759,611                                                       Patented: June 2, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David R. Langfitt, Jr., Vero Beach, Floida.

Signed and Sealed this Twenty-Fifth Day of May, 1999.

DAVID L. LACEY
*Supervisory Patent Examiner*
Art Unit 1761